Figure 1:
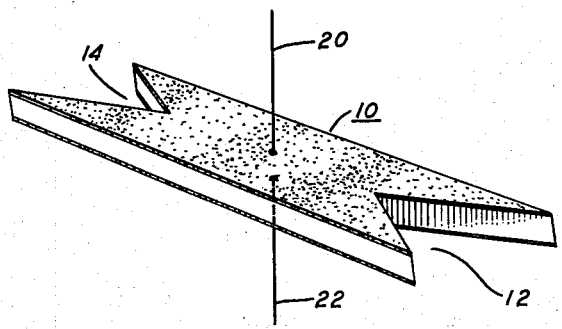

Aug. 4, 1964 W. P. MASON 3,143,672
SINGLE CRYSTAL QUARTZ FILTER ELEMENTS, OSCILLATORS AND TRANSDUCERS
Filed Sept. 14, 1962

INVENTOR
W. P. MASON
BY
H. O. Wright
ATTORNEY

United States Patent Office 3,143,672
Patented Aug. 4, 1964

3,143,672
SINGLE CRYSTAL QUARTZ FILTER ELEMENTS, OSCILLATORS AND TRANSDUCERS
Warren P. Mason, West Orange, N.J., assignor to Bell Telephone Laboratories, Incorporated, New York, N.Y., a corporation of New York
Filed Sept. 14, 1962, Ser. No. 223,730
6 Claims. (Cl. 310—9.5)

This invention relates to elements cut from single crystals of quartz for use as piezoelectric filter and oscillator crystals, and transducers. More particularly, it relates to such elements intended to be operated in the high frequency shear mode of vibration. This mode is also commonly designated as the thickness shear mode.

For a technical discussion of the modes of motion and the couplings between various modes, referred to hereinunder, of elements cut from a single crystal of quartz, reference may be had to the book entitled "Quartz Crystals for Electrical Circuits," edited by R. A. Heising, published by D. Van Nostrand Company, Inc., New York, 1946, chapter VI, pages 205 through 248.

In my copending application, Serial No. 202,258, filed June 13, 1962, it is disclosed that reflections from the side walls or edges parallel to the X crystallographic axis of AT and BT quartz crystal "cuts" can produce highly undesirable interfering effects and that the specific reflections involved can be eliminated by beveling those edges of the crystal at which the reflections take place to an angle such that the beveled edges are parallel with the direction of propagation of the crystal. It will become apparent from the description hereinunder that the improvement of my copending application can be incorporated in AT and BT crystals of the present invention if so desired.

The AT and BT cuts and related cuts such as the AC and BC cuts of quartz crystal elements are cut from single crystals of quartz and are usually in the shape of an elongated rectangle. The length of the element is parallel to the X or electric crystallographic axis and the width or ends are prependicular to the X axis but make particular acute angles with respect to the Z or optic crystallographic axis. When electrodes are applied to the major surfaces of such elements, they may be driven in the high frequency shear mode which is also commonly known as the thickness shear mode, as noted above.

In quartz crystal cuts which are to vibrate in the high frequency (or thickness) shear mode, outstanding examples of which are the AC, AT, BC and BT cuts, it has further been found that the principal shear mode has sufficient coupling to a particular even order flexure mode and adjacent even order flexure modes in a direction parallel to the X (or electric) crystallographic axis to produce interfering modes of vibration in the neighborhood of the desired frequency. The wavelength of the flexure mode has been found to be a constant equal to about 0.81 times the half wavelength for the high frequency shear (or thickness shear) mode. By way of example, in a typical case, the principal shear mode of the crystal elements was found to be coupled to a plurality of even order flexure modes, the more pronounced flexure mode being the eighth flexure mode, while the coupling to the adjacent sixth and tenth even order flexure modes was of appreciable magnitude.

Applicant has discovered that by reshaping the normally rectangular ends, that is, the edges perpendicular to the X (or electric) crystallographic axis, of such a crystal element in the form of a re-entrant V-shaped notch, the apex of the notch projecting toward the center of the element for a distance of two wavelengths of the more pronounced even order flexure mode and the base of the notch being equal to the width of the element and coincident with the end of the element, the more pronounced even order flexure mode is suppressed and the couplings to the adjacent even order flexure modes are very materially reduced. A substantial improvement in the frequency spectrum of the element results. The resonant frequency in the shear mode of the notched crystal is decreased by approximately one percent with respect to that of a similar un-notched crystal.

The principal object of the invention is to substantially eliminate interfering modes of motion resulting from coupling to even order flexure modes in an element cut from a single crystal of quartz and adapted and arranged for vibration in the high frequency shear (or thickness shear) mode.

Other and further objects, features and advantages of the invention will become apparent from a perusal of the following detailed description of an illustrative embodiment of the principles of the invention and from the accompanying drawing.

Figure 2:
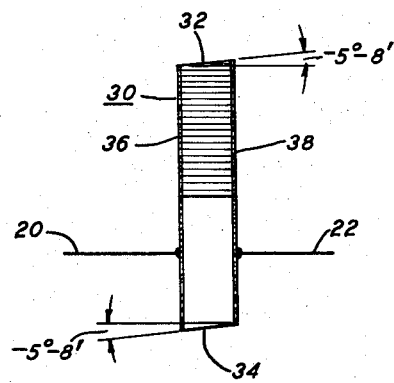

FIG. 1 of the drawing illustrates an element cut from a single crystal of quartz, the ends being in the shape of re-entrant V-shaped notches; and FIG. 2 illustrates in an end view, a further modification of a crystal of the type illustrated in FIG. 1.

In more detail in FIG. 1, crystal plate 10 should be cut from a single crystal of quartz with its length parallel to the X or electric crystallographic axis and its width perpendicular to the same axis. The width may be at any of several acute angles with respect to the Z or optic crystallographic axis as required for many well known crystal cuts such as the AC, AT, BC and BT crystals which have been employed for years as high frequency shear (or thickness shear), vibrating crystals. Such crystals have been found to be of very substantial value as units for use in high frequency wave filters and oscillators or as high frequency electromechanical transducers. Complete information on the structural features and the operating characteristics of the above mentioned and related cuts will be found in the above mentioned book by R. A. Heising and in numerous other publications which have been available to the public for over a decade. Many of these publications are referred to in Heising's book.

As indicated in the drawing, the major surfaces, that is, the top and bottom surfaces of the plate 10 are substantially covered by metallic coatings 16 and 18, respectively. Electric connections to these platings are made through conductive leads 20 and 22, respectively. Such coatings may, for example, consist of a metallized paint, or they may be metallic coatings applied by vapor deposition, or the like.

As shown in the drawing, the ends of plate 10 are notched, the notches being designated 12 and 14, respectively, the apex of each V-shaped notch extending in toward the center of the crystal by a distance equal to two wavelengths of the principal even order flexure mode which has appreciable coupling to the high frequency shear (or thickness shear) mode of the plate 10. The base of each notch is equal to the width of plate 10 and is coincident with the associated end of plate 10 as shown. It has been found that notching the plate 10 in this manner eliminates coupling between the high frequency shear mode and the principal even order flexure mode and substantially reduces its coupling to adjacent even order flexure modes of the crystal. In a typical case the principal even order flexural mode was found to be the eighth flexural mode and the adjacent sixth and tenth flexural modes also had appreciable coupling to the high frequency shear mode before the ends of the element were notched as taught in the present appplication. Accordingly, notching the ends as illustrated in FIG. 1 and described in detail above substantially eliminated coupling to the eighth order flexural mode and very appreciably reduced the couplings to the sixth and tenth order flexure modes.

In FIG. 2 a crystal 30 is shown in an end view. It may be practically identical with the crystal 10 of FIG. 1 except that its upper and lower edges 32, 34 are beveled in accordance with the teaching of applicant's copending application Serial No. 202,258, mentioned above, to be parallel to the direction of propagation of the crystal when vibrating in the thickness shear mode. The bevel of the edges is at an angle of —5° 8' as it is assumed that crystal 30 is an AT-cut crystal. The major faces are equipped with conductive electrodes 36, 38 and conductive leads 20, 22, as shown. Such a crystal will obviously combine the advantages of my copending application with those of the present application.

Numerous and varied modifications of the arrangements above described within the spirit and scope of the principles of the invention will readily occur to those skilled in the art.

What is claimed is:

1. An elongated element cut from a single crystal of quartz adapted and arranged to vibrate in a principal high frequency thickness shear mode, the said mode having in an element of rectangular shape appreciable coupling to a particular longitudinal higher order even flexure mode and even flexure modes adjacent said particular mode, each of the ends of the element having the shape of an inwardly projecting V-shaped notch, the apex of the notch extending into the element for a depth of two wavelengths of the particular flexure mode, the base of the notch being equal to the width of the element and coincident with its associated end of the element.

2. The element of claim 1 in which the element is an AT cut crystal.

3. The element of claim 1 in which the element is a BT cut crystal.

4. The element of claim 1 in which the element is an AC cut crystal.

5. The element of claim 1 in which the element is a BC cut crystal.

6. The element of claim 1 in which the longer edges of the element are beveled to be parallel to the direction of propagation for thickness shear mode vibration of the element.

References Cited in the file of this patent
UNITED STATES PATENTS 2,967,958    Kosowky et al. _____ Jan. 10, 1961
3,020,424    Bechmann _____ Feb. 6, 1962